June 25, 1957 H. N. CLARK 2,797,052
CRACKLING CAKE BREAKER CONSISTING OF A HOPPER AND AN
ENCLOSED DRUM AND INTERMESHING BREAKER
BARS EXTENDING FROM HOPPER AND DRUM
Filed July 16, 1954 2 Sheets-Sheet 1

H. N. Clark
BY Lucas J. Foster
HIS ATT'Y

June 25, 1957   H. N. CLARK   2,797,052
CRACKLING CAKE BREAKER CONSISTING OF A HOPPER AND AN
ENCLOSED DRUM AND INTERMESHING BREAKER
BARS EXTENDING FROM HOPPER AND DRUM
Filed July 16, 1954   2 Sheets-Sheet 2
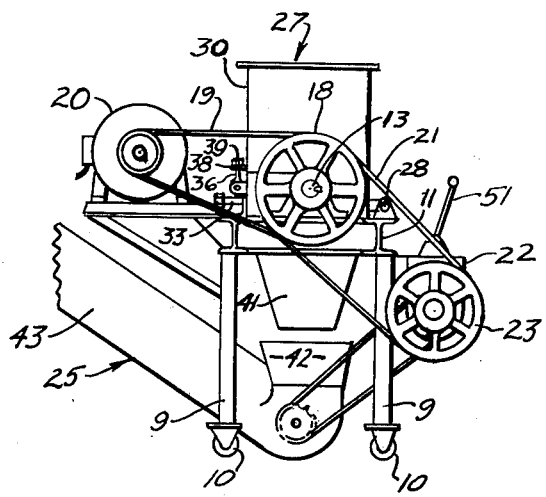
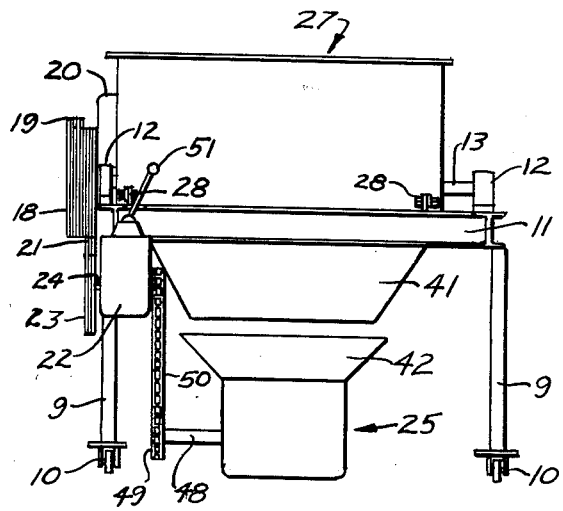
H. N. Clark
BY Lucas J. DeKoster
HIS ATT'Y

United States Patent Office 2,797,052
Patented June 25, 1957

2,797,052

CRACKLING CAKE BREAKER CONSISTING OF A HOPPER AND AN ENCLOSED DRUM AND INTERMESHING BREAKER BARS EXTENDING FROM HOPPER AND DRUM

Harvey N. Clark, Worthington, Minn.

Application July 16, 1954, Serial No. 443,819

7 Claims. (Cl. 241—190)

This invention pertains to machines for breaking materials and more particularly to a power driven machine adapted to break cakes of cracklings in a rendering plant to a size suitable for grinding.

In a rendering plant for the disposal of carcasses of animals which have died from causes other than slaughter for human consumption, it is customary to render out the flesh of the animal in the form of cracklings. This is done by cooking the skinned carcass until the meat is thoroughly cooked. The cooked meat is then shovelled into the cylinder of a heavy press in alternate layers with heavy metal disks. When the cylinder is full, pressure is applied to the upper metal disk thus pressing out all the fats, juices, etc. and forming very hard and compact disks or cakes of what is known in the art as cracklings. The crackling cakes are not usable in that form, but when broken and crushed are usable as a supplemental animal feed of high protein value.

Formerly the breaking up of the crackling cakes was done by hand with an axe or the like, requiring much laborious effort. Machines usable for the purpose were too complicated or expensive either in original cost or in upkeep, for the average small rendering plant. By my invention, I provide a machine capable of rapid crushing of the cakes while at the same time being of relatively simple construction and with virtually no maintainance problems. In addition, I can, by my invention, provide for the rapid removal and loading of the broken material.

Figure 1:
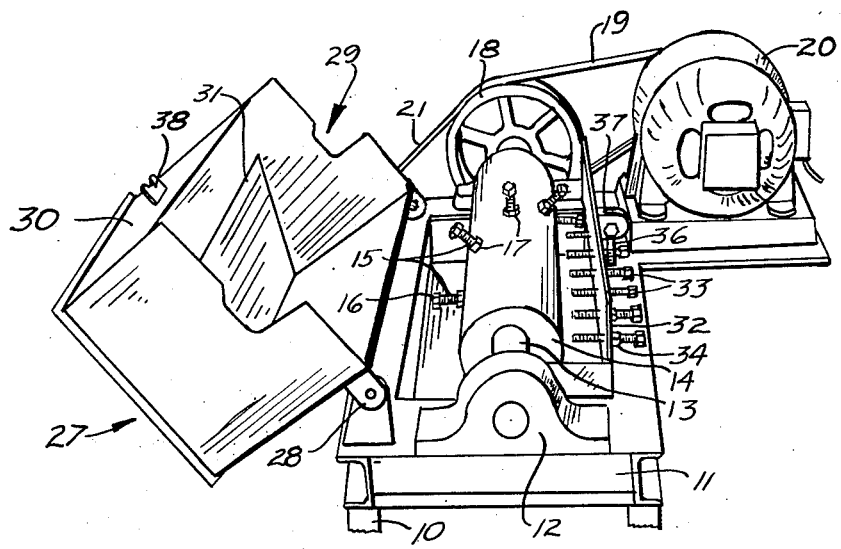
Figure 2:
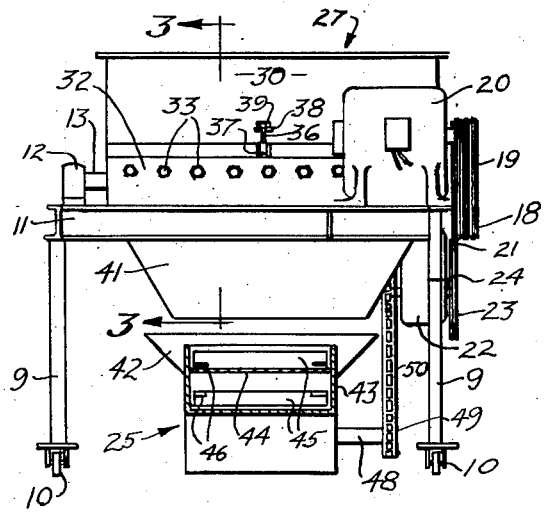
Figure 3:
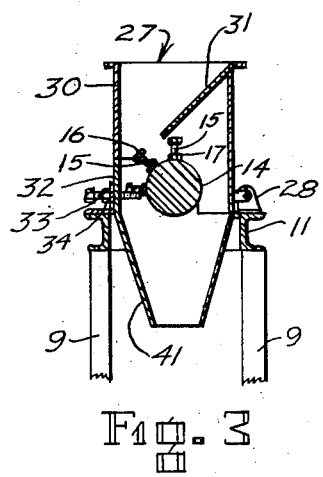

In the figures:

Fig. 1 is a partial perspective view of my device with the hopper laid back to show the crusher parts, Fig. 2 is a side elevational view of my device, Fig. 3 is a sectional view along line 3—3 of Fig. 2, Fig. 4 is an end elevational view of my device showing the power transmission, and Fig. 5 is a side elevational view from the side opposite to that of Fig. 2.

Briefly my device comprises a motor driven drum having a spiral row of headed bars extending radially therefrom. A hopper to hold the crackling cakes surrounds the drum and guides the cakes into the downward moving headed bars. Stationary bars extend from the wall of the hopper between the paths of the headed bars as they are carried around by the drum and on the downward moving side. Thus as the cake is caught by the headed bars, it is hammered and cracked between the stationary bars. Means for delivering the cracked cake to further processing is also provided by my invention.

More specifically and referring to the figures, my breaker is mounted on a stand having four legs 9 which may be preferably made of structural steel elements such as angle iron. Casters 10 may be provided although it is conceived that the breaker may be fixed in position. A rectangular frame 11 also of structural steel elements is mounted on the legs and provides support for pillow blocks 12 in which the main bearings for my device are mounted. A shaft 13 is journalled in the bearings in the pillow blocks 12 and carries a drum 14 between the bearings. This drum as is best shown in Fig. 1, has mounted on it a single spiral row of breaker bars 15. These breaker bars have heads 16 on their outer ends and may conveniently be formed from heavy bolts threaded into nuts 17 welded onto the drum at the proper location. It is also conceived that holes in the drum could be tapped or otherwise provided with threads to receive the bolts. Welding the nuts onto the drum merely avoids the necessity of expensive machining operations. It will be obvious to those skilled in the art that jam-nuts or lock nuts could be added to the assembly to prevent movement of the bolts if it should be necessary. A pulley 18 is fixed to one end of the shaft 13 and this pulley is driven by belts 19 from a source of motive power such as a motor 20 which may also be mounted on the frame 11. It will be evident that many other sorts of drive may be used although there are certain advantages of the belt drive in an application of this type.

A gear box 22 having a series of gear trains, such as the well known automobile transmission, is also driven by belts 21 from the pulley 18 to another pulley 23 on the driven shaft 24 of the gear box. This provides power for an elevator 25 which removes the broken pieces of the cake away from the breaker as will be later described.

A hopper 27 is hinged to the frame 11 by simple hinges 28 and surrounds the upper part of the drum 14. This hopper may be formed of sheet metal fabricated by any preferred means, but should be cut away as at 29 (Fig. 1) to surround the shaft 13, and will preferably have a shortened side 30 opposite the hinges. It will be evident that the hinged construction makes the entire machine easy to clean or repair without any major difficulty. A vane 31 may be welded or otherwise fixed within the hopper to guide the cakes to the side of the drum 14 on which breaker bars 15 are traveling in a downward direction. This is also the side of the hopper which is shortened. The vane 31 prevents overloading of the hopper as well as directing the pieces to the crushing side of the machine.

On the frame 11 beneath the shortened side 30, I provide a wall 32 which completes the side. This wall may be preferably formed of a heavy steel angle iron welded in place on the frame 11 together with any additional sheet metal which may be needed to build the wall up to the required height. Attached to this wall along a horizontal line at a location somewhat below the horizontal centerline of the drum 14 are a series of stationary bars 33 extending inwardly toward the drum. These bars are located at points between the paths of the breaker bars 15. The spacing is preferably midway between the paths, but is not necessarily so. It is, however, very desirable to have the stationary bars somewhat below the horizontal centerline of the drum. For reasons not fully understood by me, this location is more efficient in the breaking up of the cakes, and also in keeping the bars free of material already partly cracked.

In the embodiment shown, the bars 33 are also formed of heavy bolts threaded into tapped holes in the angle-iron wall 32. The nuts 34 are then jammed by screwing them fast against the wall 32 to hold the bars 33 in their adjusted position. This construction provides advantages of easy adjustability or removal and replacement as well as being inexpensive in original cost.

A simple latch means is provided to hold the hopper in its closed or use position as shown in all the figures except Fig. 1. This latch means in the embodiment shown, comprises an eye bolt 36 held between a clevis 37 fixed to the wall 32. A U-shaped bracket 38 is fixed to the shortened side 30 of the hopper in a position to receive the bolt 36, and a nut 39 (Fig. 2) is threaded onto the bolt to hold the hopper in place.

A guide chute 41 is provided beneath the hopper to catch the broken pieces and guide them into some sort of receptacle. In the embodiment shown, the receptacle is the hopper 42 of the elevator 25. It is conceived, however, that a wheelbarrow or similar device might be used. It is also conceived that some other sort of conveyer device than an elevator might be used. In general it is desired that the broken material be elevated but belt-type conveyers might be used to transport the material horizontally without going beyond the scope of my invention.

The elevator shown is of a type customarily used on farms and on certain types of farm equipment. These elevators comprise a chute 43 terminating in a hopper 42 at the lower end. A floor 44 is provided, over which floor, cleats 45 are pulled by a driven chain or chains 46. At the upper end (not shown) the elevator simply dumps the elevated material into whatever receptacle is provided. This is a device well known in the art and will not be further described except as immediately concerns my invention. The chains 46 are driven through a shaft 48 and sprocket 49 from the gear box 22. A chain 50 is used to provide a positive drive since there is very little shock to be absorbed. However it will be apparent that the drive could be through a belt or by direct gear train in place of the chain and sprockets. It is also conceived that a single speed gear train could be used in place of the change-speed transmission 22 as shown.

In the operation of my device, the power is turned on after the gear shift lever 51 has been set to provide the selected elevator speed. This power, as will be apparent, drives both the drum 14 and the elevator 25. The cakes of pressed cracklings are then taken just as they come from the press and are fed into the hopper 27. The vane 31 guides the cakes into the downgoing side of the drum 14 where it is caught between the breaker bars 15 and the stationary bars 33 and is broken by the action of the bars augmented by the heads 16. It is believed the heads cut grooves in the underside of the cakes before the cakes hit the stationary bars which may be the cause of the finer breaking achieved by my device. Whatever the reason, it has been discovered that the headed bars give a much more satisfactory product with less expenditure of energy than an unheaded bar.

After the cakes are broken, the broken bits fall down the chute 41 into the elevator hopper 42 and are carried away to a bin, truck, sack or any other type of receptacle which it is desired to use.

In order to clean or repair my device, it will be obvious that the only taking down that need be done is to release the latch means by removing the nut 39 and opening the hopper 27. This exposes the entire machine which may then be washed out with a hose or otherwise cleaned. It is also possible with the hopper in this position as shown in Fig. 1, to make all the necessary repairs or replacement of bars, bearings or any other parts which might become worn or damaged.

Having thus described my invention in an embodiment thereof, it will be understood that variatoins may be made therefrom without departing from the scope of my invention as limited only by the following claims.

I claim:

1. A breaker comprising a frame, hopper means mounted on said frame including a hopper having one short wall and hinged to the frame on the side opposite said short wall, and wall means on said frame adapted to complete the wall partially formed by said short wall, stationary bars adjustably mounted on said wall means extending inwardly of said hopper, a drum rotatably mounted on said frame, said drum being within the lower part of said hopper means, headed breaker bars on said drum in locations such that they will be carried between said stationary bars by rotation of said drum, and power means connected to said drum to drive it rotatably.

2. A breaker comprising a frame, hopper means hingedly mounted on said frame and having a partial wall opposite the hinged mounting, wall means on said frame adapted to complete the partial wall, bearing means on said frame, drum means within the lower part of said hopper means rotatably journalled in said bearing means, headed breaker bars adjustably mounted at spaced apart locations along a spiral line on said drum means, stationary bars adjustably mounted on said wall means extending toward said drum means, said stationary bars being located so that a breaker bar will pass between each pair of adjacent stationary bars as said drum means is rotated, and drive means connected to said drum means to drive it rotatably.

3. The breaker of claim 2 in which the breaker bars are bolts threadably engaged in nuts fixed to said drum means.

4. A breaker comprising a frame, a hopper mounted on said frame, drum means rotatably journalled on said frame and located within the lower part of said hopper, headed breaker bars adjustably mounted on said drum means, said bars being located in spaced apart positions on a spiral line about said drum means, and being adapted to be carried thereby in circular paths, stationary bars adjustably mounted on said hopper extending toward said drum means and between the circular paths of said breaker bars, motive means on said frame adapted to drive said drum means in a direction such that the breaker bars are carried downwardly between said stationary bars, power transmission means on said frame adapted to be driven by said motive means, conveyer means having a receptacle beneath said hopper, said conveyer means being connected to said transmission means to be driven thereby.

5. A breaker comprising a frame, a hopper hingedly mounted on said frame at one side of said hopper, said hopper having a partial wall opposite the hinged mounting, said wall extending from the top of the hopper only partially to said frame, wall means built up from said frame beneath said partial wall to complete the hopper, latch means engageable between said wall means and said partial wall to hold said hopper in its use position, bearing means mounted on said frame, drum means journalled in said bearing means and being located within the lower part of said hopper, stationary bars adjustably mounted in said wall means at spaced apart locations along a line at a level below the horizontal centerline of said drum means, said stationary bars extending inwardly of said hopper toward said drum means, said drum means being provided with threaded openings at spaced apart intervals along a spiral line about said drum means, adjustable breaker bars comprising headed bolts threadably engaged in said openings, said bolts being located so that they will be carried between said stationary bars by rotation of said drum means, and motive means mounted on said frame operably connected to said drum means to rotate said drum means in a direction such that the breaker bars will be carried downwardly past said stationary bars.

6. A breaker comprising a frame, hopper hingedly mounted on said frame at one side of said hopper, said hopper having a partial wall opposite the hinged mounting, said wall extending from the top of said hopper only partially to said frame, wall means built up from said frame beneath said partial wall to complete said hopper, latch means engageable between said wall means and said partial wall to hold said hopper in its use position, bearing means mounted on said frame, drum means journalled in said bearing means and located within the lower part of said hopper, stationary bars adjustably mounted in said wall means at spaced apart locations along a line at a level below the horizontal centerline of said drum means, said stationary bars extending inwardly of said hopper toward said drum means, said drum means being provided with threaded openings at spaced apart intervals along a spiral line about said drum means adjustable breaker bars comprising headed bolts threadably engaged in said openings, said bolts being located so that they will be carried between said stationary bars by rotation of said drum means, a vane in said hopper sloping downward toward said stationary bars whereby material in said hopper is guided between said stationary bars and said breaker bars, and motive means mounted on said frame and operably connected to said drum means to rotate said drum means in a direction such that said breaker bars will be carried downwardly past said stationary bars.

7. A breaker comprising a frame, a hopper hingedly mounted on said frame at one side of the hopper, said hopper having a partial wall opposite the hinged mounting, said wall extending from the top of said hopper only partially to said frame, wall means built up from said frame beneath said partial wall to complete said hopper, latch means engageable between said wall means and said partial wall to hold said hopper in its use position, bearing means mounted on said frame, drum means journalled in said bearing means and being located within the lower part of said hopper, stationary bars adjustably mounted in said wall means at spaced apart locations along a line at a level below the horizontal centerline of said drum means, said stationary bars extending inwardly of said hopper toward said drum means, said drum means being provided with threaded openings at spaced intervals along a spiral line about said drum means, adjustable breaker bars comprising headed bolts threadably engaged in said openings, said bolts being located so that they will be carried between said stationary bars by rotation of said drum means, a vane in said hopper sloping downward toward said stationary bars whereby material in said hopper is guided between said stationary bars and said breaker bars, motive means mounted on said frame operably connected to said drum means to rotate said drum means in a direction such that said breaker bars will be carried downwardly past said stationary bars, chute means on said frame below said hopper to receive material therefrom, conveyor means below said chute means including a receptacle in position to receive said material from said chute means, a change-speed transmission on said frame connected to said motive means to be driven thereby, and driving means between said transmission and said conveyor means to provide for driving said conveyor means by said motive means.

References Cited in the file of this patent

UNITED STATES PATENTS

| | | |
|---|---|---|
| 349,607 | Reeder | Sept. 21, 1886 |
| 519,629 | Haygood et al. | May 8, 1894 |
| 1,440,429 | Williams | Jan. 2, 1923 |
| 1,840,893 | Giddings | Jan. 12, 1932 |
| 2,322,460 | Mankoff | June 22, 1943 |
| 2,643,065 | Clawson | June 23, 1953 |
| 2,669,271 | Treckmann | Feb. 16, 1954 |

FOREIGN PATENTS

| | | |
|---|---|---|
| 468,400 | France | Apr. 25, 1914 |
| 869,102 | France | Oct. 29, 1941 |
| 978,855 | France | Nov. 29, 1950 |